No. 614,372. Patented Nov. 15, 1898.
W. G. DE RAMUS.
MUSIC LEAF TURNER.
(Application filed Feb. 28, 1898.)
(No Model.) 2 Sheets—Sheet 1.
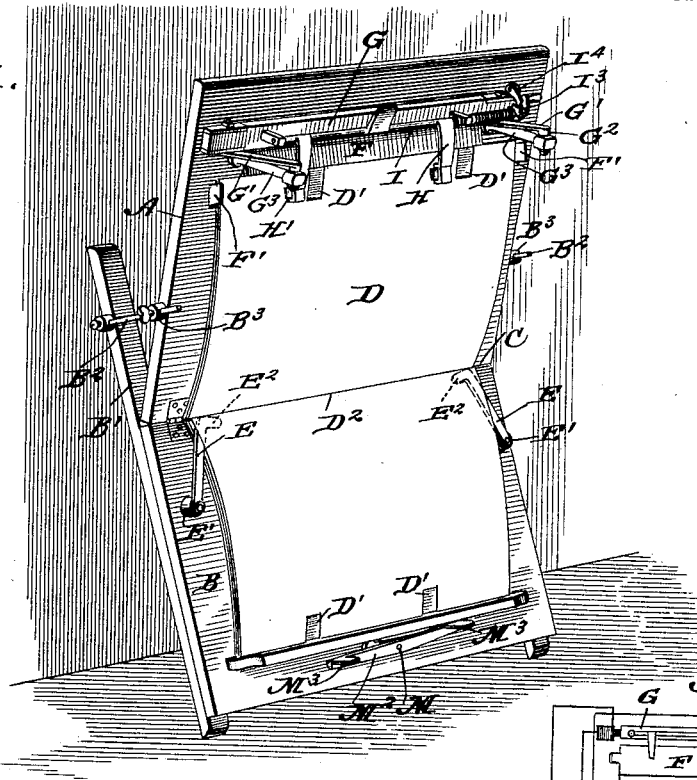
Fig. 1.
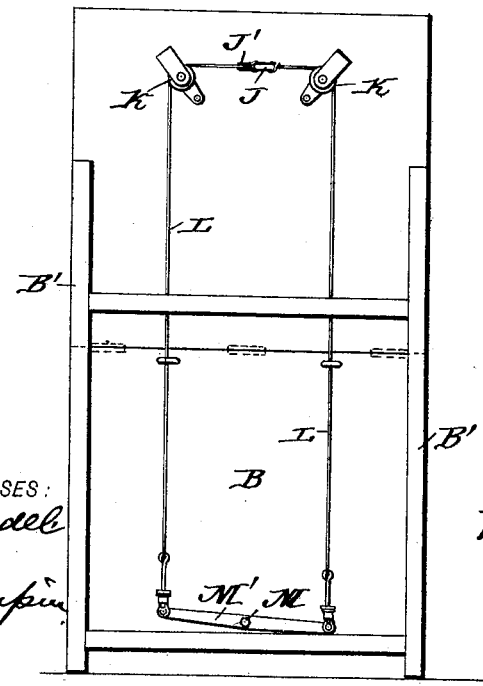
Fig. 2.
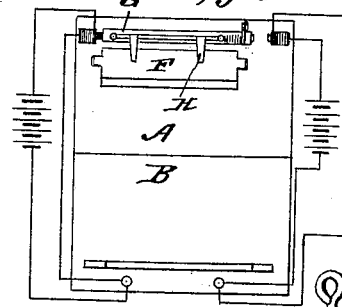
Fig. 9.
Fig. 3.
WITNESSES:
M. S. Blondel
P. B. Turpin
INVENTOR
W. G. De Ramus.
BY Munn & Co.
ATTORNEYS.
THE NORRIS PETERS CO., PHOTO-LITHO., WASHINGTON, D. C.

No. 614,372. Patented Nov. 15, 1898.
W. G. DE RAMUS.
MUSIC LEAF TURNER.
(Application filed Feb. 28, 1898.)
(No Model.) 2 Sheets—Sheet 2.
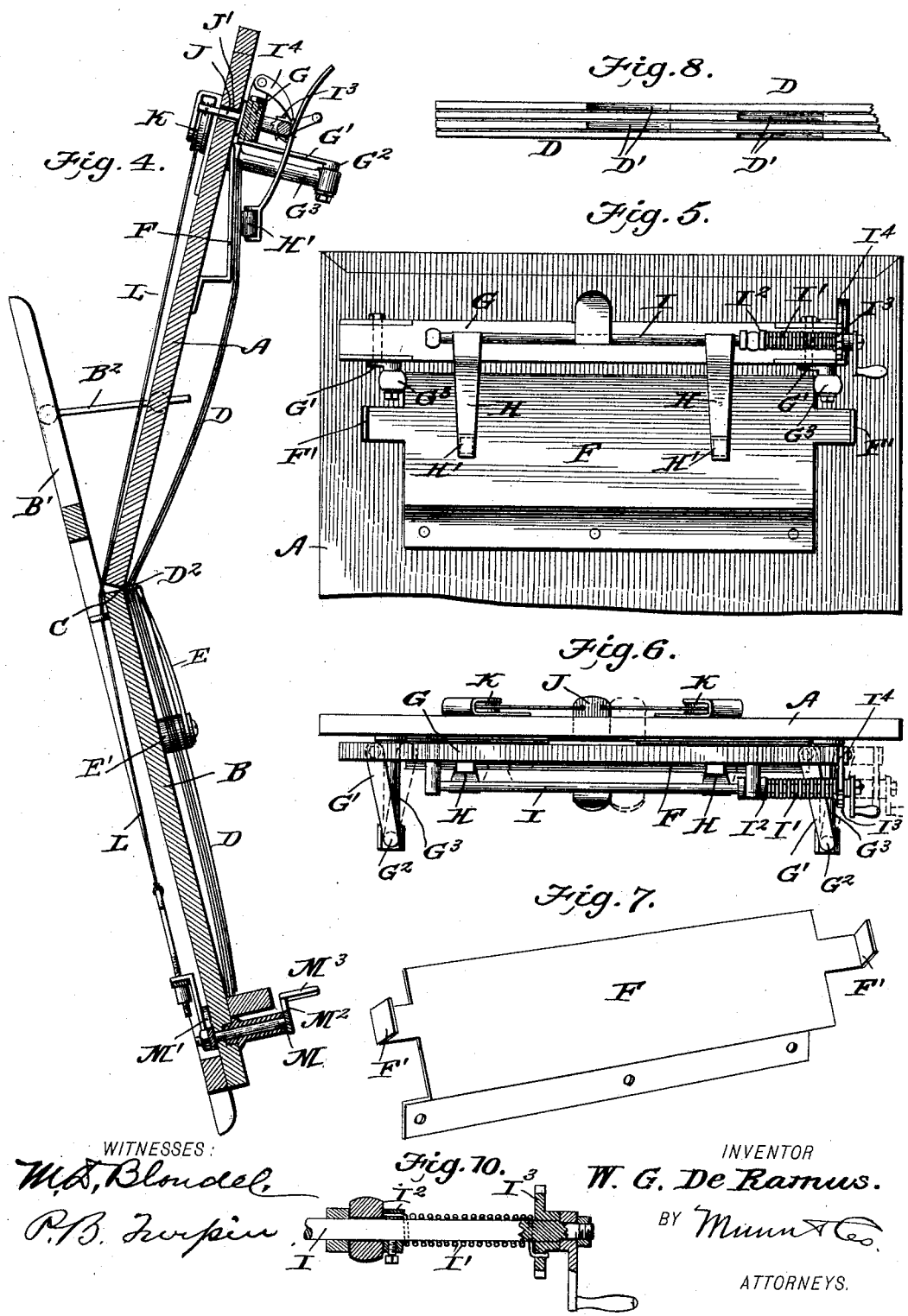
WITNESSES: INVENTOR
W. G. De Ramus.
BY Munn & Co.
ATTORNEYS.

UNITED STATES PATENT OFFICE.

WILLIAM G. DE RAMUS, OF PRATTVILLE, ALABAMA, ASSIGNOR OF ONE-HALF TO DANIEL H. RAWLINSON, OF SAME PLACE.

MUSIC-LEAF TURNER.

SPECIFICATION forming part of Letters Patent No. 614,372, dated November 15, 1898.

Application filed February 28, 1898. Serial No. 671,976. (No model.)

*To all whom it may concern:*

Be it known that I, WILLIAM GREEN DE RAMUS, residing at Prattville, in the county of Autauga and State of Alabama, have made certain new and useful Improvements in Music-Leaf Turners, of which the following is a full, clear, and exact description.

My invention is an improved leaf-turner for use in turning the leaves of music or as a copy-holder for use by type-writists or other copyists; and the invention consists in certain novel constructions and combinations of parts, as will be hereinafter described, and pointed out in the claims.

In the drawings, Figure 1 is a perspective view of my invention as in use. Fig. 2 is a back view of the apparatus. Fig. 3 is a detail view of the rear section of the rocking lever. Fig. 4 is a vertical section of the turner. Fig. 5 is a front view of the upper portion of the apparatus, the leaves being removed. Fig. 6 is a top plan view of the apparatus. Fig. 7 is a detail view of the plate which forms the cross-bearing for the leaves. Fig. 8 is a top edge view, enlarged, of the leaves. Fig. 9 is a diagrammatic view illustrating the means whereby electricity may be employed to operate the longitudinally-sliding carriage. Fig. 10 is a detail section.

In the construction shown the framing of the turner comprises the upper and lower sections A and B, which are jointed at C, so the sections may be set at any desired angle, the lower section B having extensions B' in rear of the section A and connected therewith by the stay-rods B², which are connected adjustably at B³ with the section A, so the latter may be held to secure the desired drop of the leaves when released by the clamps or holders, presently described.

The leaves D are preferably of heavy stiff glazed paper and are arranged in two sets, the leaves of one set alternating with those of the other, and all the leaves having cut-away portions D', the openings or cut-away portions D' of the same set being in alinement with each other and out of alinement with the leaves of the other set, as is best shown in Fig. 8. These leaves in practice fold upon a line D² midway between their upper and lower edges and are secured just below such fold to the framing by the holders or clips E, which are pivoted at their ends E' to the frame and are adapted at their ends E² to overlap the sheets or leaves D just below the fold D². The leaves are applied to the frame, as shown in Fig. 1, and means are provided for holding their upper edges and for releasing the leaves successively at such edges, so they may fall to expose the leaf below.

To insure the better dropping of the leaves and also to furnish a flat surface to receive the pressure of the clamps or holders, presently described, I prefer to provide the bearing F, which extends from side to side of the frame and has at its ends lugs F', forming keepers for the leaves, the said bearing projecting from the face of the frame-section A, near the top thereof, and giving a comparatively sharp bend to the leaves, as will be understood from Fig. 4.

In the construction shown for releasing the leaves I provide a longitudinally-reciprocable carriage G near the top of the frame A and provided with the fingers H, arranged at their ends H' to bear on the face of the leaf or to escape through the cut-away portions D' of the leaves when properly adjusted for such purpose. It is preferred to provide at such ends H' rubber rollers to bear on the surface of the leaves, because such rollers will avoid friction on the paper as the fingers are moved with the carriage and will prevent the slipping of the leaves downward out of engagement with the fingers so long as such rollers are caused to press upon the surface of the paper. As stated, the carriage is longitudinally reciprocable, and the fingers are given a like movement, and the extent of this movement is equal to the distance between the line of the openings D' of one set of leaves and such openings in the other set of leaves, and the line of openings in one set of leaves is made at the end of the stroke of the fingers H as they move in one direction, while the line of the openings in the other set of leaves is made at the end of the stroke of the fingers H in the opposite direction. From the foregoing it will be seen that as the carriage is moved in one direction its fingers H' will escape into the openings D' of the upper leaf and permit such leaf to fall, the fingers pressing upon the next under leaf, which leaf may be released by moving the carriage in the opposite direction, the reciprocal movement of the carriage thus operating to release the leaves successively, as is desired.

In the use of my invention music may be printed directly upon the leaves or the music on separate sheets, or the matter to be copied may be suitably secured to the leaves by means of pins or other suitable fastenings.

The carriage G is suspended at its ends on links G', whose outer ends are pivoted at $G^2$ to posts $G^3$, mounted on the frame, and the fingers H are secured to a shaft I, journaled to the carriage and provided with a spring I', by which the shaft is given the necessary tension to press the fingers H tightly against the leaf. This spring I' may be adjusted by means of the construction shown, wherein the spring is secured at one end $I^2$ to the shaft I and has its other end fixed to a ratchet-wheel $I^3$, which may be turned upon the shaft to adjust the tension of the spring and held in such adjustment by the pawl $I^4$ on the carriage.

It is manifest the carriage may be reciprocated in various ways, and, where desired, electricity may be employed for such purpose in the manner indicated in Fig. 9, wherein armatures at the opposite ends of the carriage are attracted by magnets, which may be alternately energized in any suitable way—such, for instance, as by circuit-closers—which may be readily operated without requiring the operator to stop work.

The construction shown for mechanically operating the carriage includes a lug J, projecting through a slot J' in the frame-section A, between two opposite rollers K, around which passes a wire or line L, whose ends connect with the opposite ends of the rear section M' of a lever M, whose front section $M^2$ is adapted at its ends $M^3$ to be struck by the operator, so the lever may be rocked to first move the carriage in one direction and then in the other, as will be readily understood from Figs. 2 and 4.

In operation the frame may be supported at its lower edge on a suitable base and rested against an upright wall, as shown in Fig. 1, or be otherwise suitably supported, and the frame can be formed to adapt it for use on square, grand, or upright pianos, on organs, or on a type-writer, as may be desired.

The apparatus is simple, accurate, and durable and will greatly expedite the work of type-writists and will be found very convenient by performers on the piano or similar instruments.

Having thus described my invention, what I claim, and desire to secure by Letters Patent, is—

1. In a leaf-turner, a longitudinally-reciprocable carriage having a shaft provided with fingers by which to hold the leaves, and a spring by which to give tension to said shaft, substantially as set forth.

2. In a leaf-turner, the combination of the frame, the posts projecting from the front face thereof, the links pivoted at one end to said posts, the longitudinally-reciprocable carriage supported on the swinging ends of said links, and laterally-movable devices carried by said carriage for holding and releasing the leaves, as set forth.

3. The combination in an apparatus substantially as described, of the frame, the posts thereon, the links pivoted at one end to said posts, the longitudinally-reciprocable carriage supported on the swinging ends of said links and devices on said carriage for holding and releasing the leaves, substantially as set forth.

4. In a leaf-turner, the combination of the frame, composed of an upper and a lower section jointed together, leaves secured by their lower edges to the lower end of the upper section, means connected to the lower section for holding the upper section in advance of a perpendicular position, whereby the leaves will have a tendency to drop, and devices secured to said upper section and by which the upper edges of the leaves are held and released, as set forth.

5. A leaf-turner substantially as described, comprising the frame made in sections and adjustable to different angles, the movable carriage on the upper section provided with means for holding and releasing the leaves, the rocking lever and connection between the rocking lever and the carriage, such connections including adjusting devices whereby the operating devices may be adjusted to correspond with the adjustments of the frame, substantially as set forth.

6. In a leaf-turner, the combination with the frame, of a longitudinally-reciprocable carriage mounted on the said frame and provided with a shaft rotatable at right angles to its direction of reciprocation, fingers secured to said shaft and arranged to hold and release the leaves, and a spring coiled around said shaft and pressing said fingers against the leaves as set forth.

7. In a leaf-turner, the combination with the frame supporting the leaves, of the longitudinally-reciprocable carriage mounted on said frame and provided with a shaft rotatable at right angles to the direction of reciprocation of the carriage, fingers carried by said shaft and arranged to hold and release said leaves, a spring coiled around said shaft and by which the fingers are pressed against the leaves, and a device attached to said carriage for regulating the tension of said spring, as set forth.

8. An apparatus substantially as described, comprising the frame composed of jointed sections arranged to be adjusted to different angles to each other, the device for securing and releasing the leaves, such device being supported on one of the frame-sections and the operating devices on the other frame-section and connections between said operating devices and the device for securing and releasing the leaves said connections being adjustable whereby they may be caused to operate properly in the different angles of the frame-sections relative to each other substantially as set forth.

WILLIAM G. DE RAMUS.

Witnesses:
W. H. JONES,
G. B. COWLING.